Aug. 21, 1956      L. R. HEIM      2,759,244

METHOD OF MAKING BEARING

Original Filed Sept. 7, 1949      3 Sheets-Sheet 1

INVENTOR
Lewis R. Heim
BY
Wooster & Davis ATTORNEYS

Aug. 21, 1956 L. R. HEIM 2,759,244
METHOD OF MAKING BEARING
Original Filed Sept. 7, 1949 3 Sheets-Sheet 2

Inventor
Lewis R. Heim
By Wooster & Davis, Attorneys.

Aug. 21, 1956     L. R. HEIM     2,759,244
METHOD OF MAKING BEARING
Original Filed Sept. 7, 1949     3 Sheets—Sheet 3

Inventor
Lewis R. Heim
Wooster & Davis, Attorneys.

U nited States Patent Office 2,759,244
Patented Aug. 21, 1956

2,759,244
METHOD OF MAKING BEARING

Lewis R. Heim, Fairfield, Conn., assignor to The Heim Company, Fairfield, Conn., a corporation of Connecticut Original application September 7, 1949, Serial No. 114,419. Divided and this application September 14, 1950, Serial No. 184,803

5 Claims. (Cl. 29—149.5)

This invention relates to bearings of the type shown in my prior Patents No. 2,366,668, January 2, 1945, for Method of Making Bearings, and No. 2,400,506, May 21, 1946, for Rod End Bearing and Method of Making Same.

In the methods of these patents a spherical bearing member is mounted in a support by placing it in an opening or bore in the support and then forcing against this member from the opposite sides thereof a pair of malleable rings or bushings to expand said bushings and cause them to conform on their inner surfaces to the shape of the bearing member and at their outer surfaces to fill and conform to the shape of the opening or bore. In this operation the bushings tightly grip the spherical bearing member and hold it against movement therein. Therefore in order for the bearing member to have rocking movement it must be loosened in the bushings, which loosening is done as a separate operation in machines for that purpose. This involves considerable expense.

It is therefore a principal object of the present invention to provide a bearing of this type and method of making it in which the bearing member is automatically loosened in the bushings during and as a part of the operation of mounting the bearing.

Another object is to provide a bearing of this type in which there is a lubricating channel about the medial or equatorial line of the spherical bearing member and which channel also provides a reservoir for lubricant.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

This application is a division of my prior application Serial No. 114,419, filed September 7, 1949, Patent No. 2,665,956, January 12, 1954.

Figure 1:
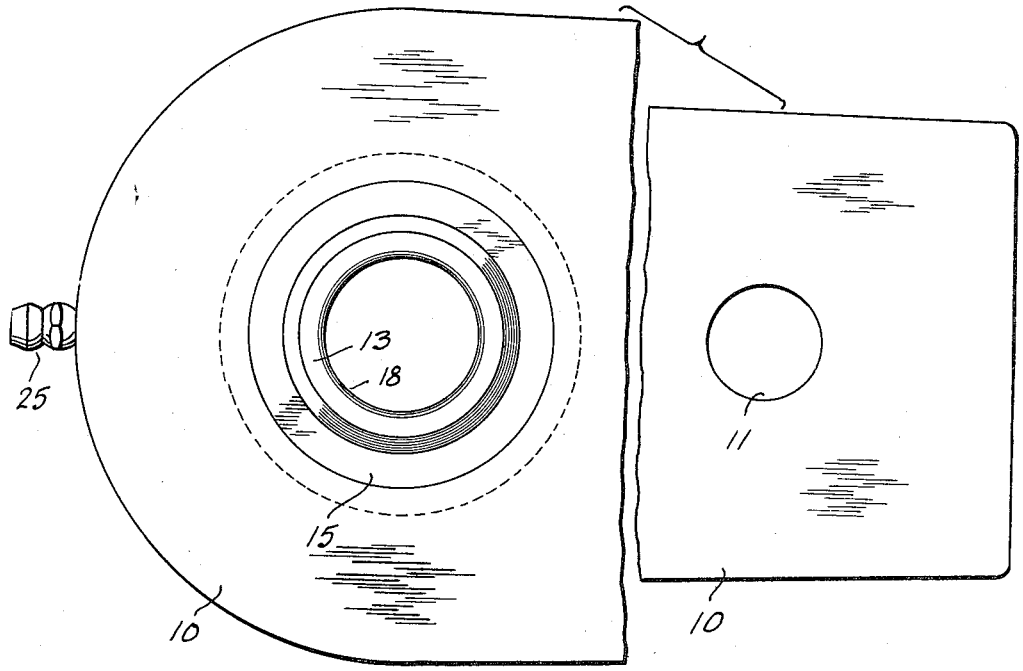
Fig. 1 is a top plan view of a sweepstick for looms made of yieldable resilient material showing my improved bearing mounted therein.
Figure 2:
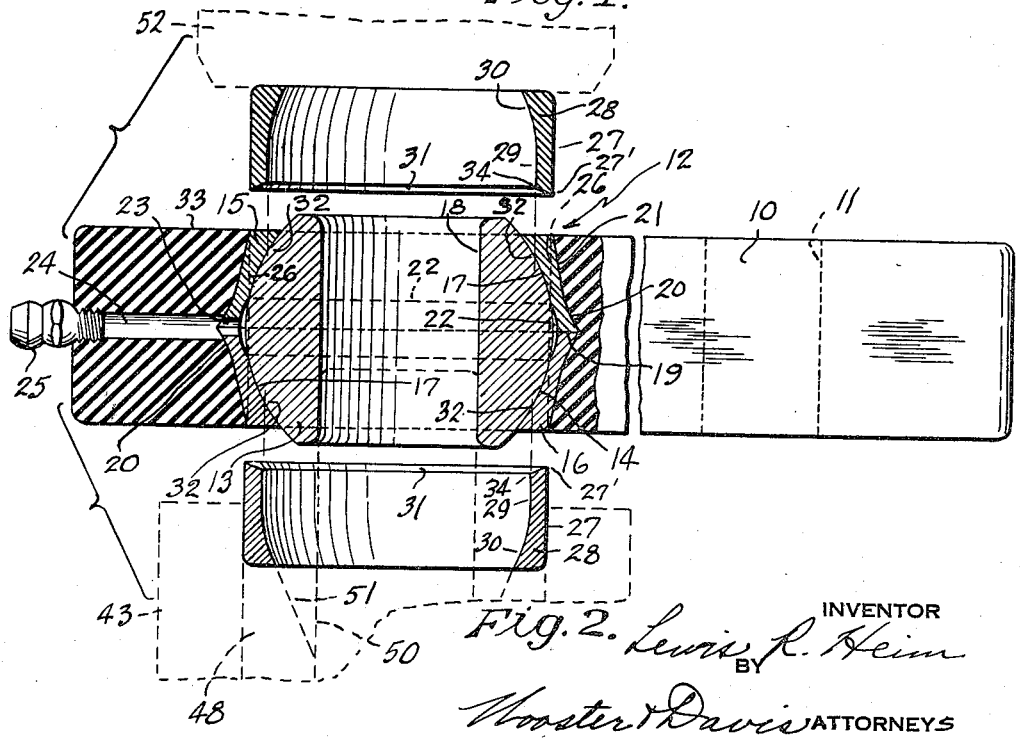
Fig. 2 is a partial side elevation and partial section of the device of Fig. 1, the section being taken through the improved bearing at one end of the sweepstick and also showing in section the two mounting rings for the rocking bearing and indicating part of the operation of mounting the bearing in the body of the sweepstick or other suitable support of resilient yieldable material.
Figure 3:
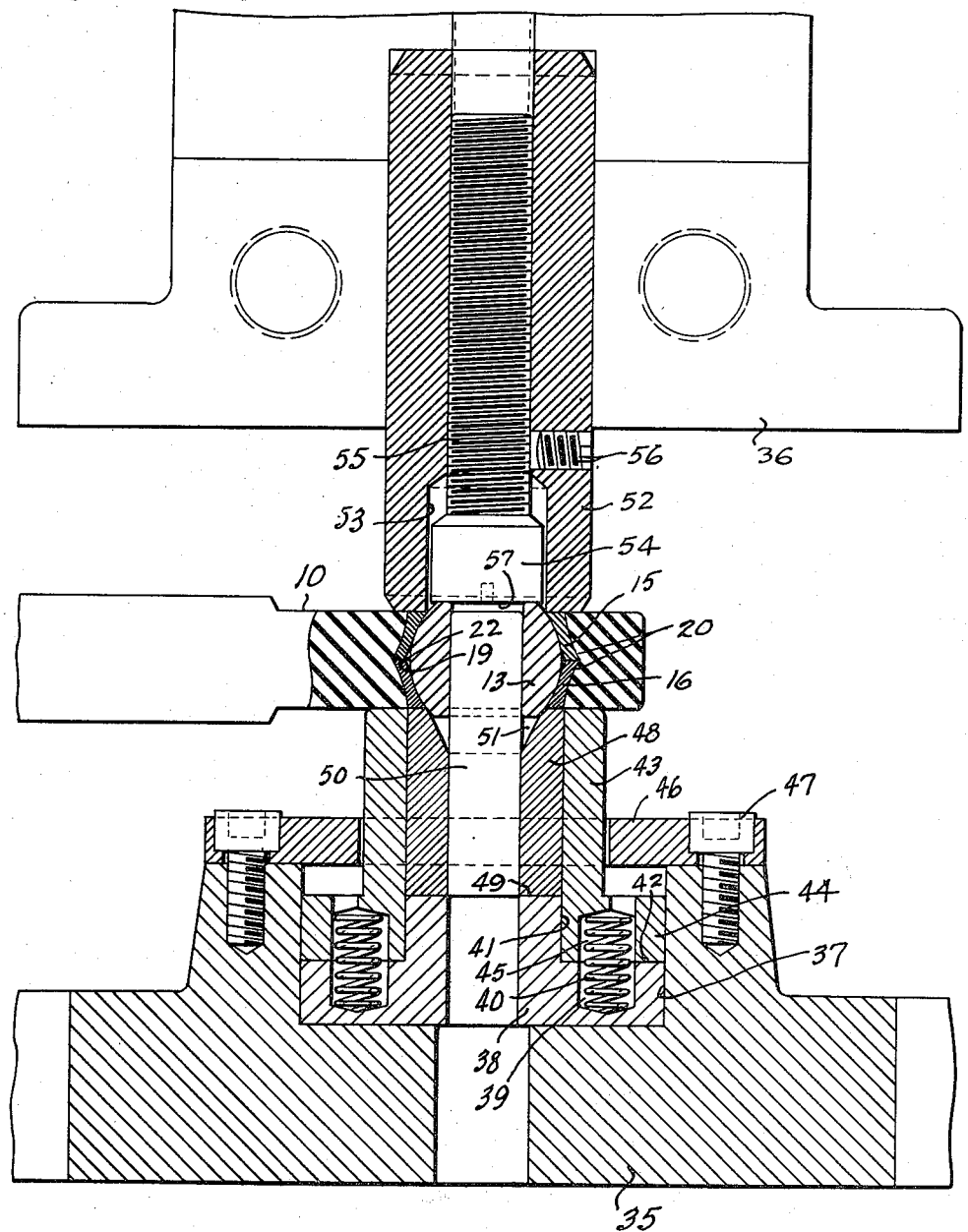
Fig. 3 is a detail sectional view with certain parts in elevation indicating one form of mechanism for mounting the bearing and the operations of the improved method of so mounting.

In Figs. 1, 2 and 3 the bearing is shown by way of example as comprising a housing or body 10 providing a supporting member of any suitable cross section, preferably substantially rectangular as shown, formed of some suitable yielding, resilient, shock-absorbing material, such, for example, as vulcanized rubber or other plastic, which is sufficiently hard and rigid to retain its shape and still has a certain amount of yield, resiliency and flexibility to absorb shocks in operation but still will transmit the necessary force required for this operation. It is shown in the form of a sweepstick for looms and may be a solid bar of this vulcanized rubber or other plastic, or it could contain a strengthening fabric with any suitable number of layers of this fabric (not shown) embedded in or vulcanized in the rubber or other plastic. At one end it may have a plain bearing 11 for connection to the mechanism with which it is used.

At the opposite end it is provided with an improved bearing 12 including an element 13 capable of lateral rocking movement to compensate for misalignment in the parts connected by the sweepstick. As suggested above, a sweepstick is shown merely by way of example, as the body 10 may be of any other suitable shape or article of this type of material in which such a bearing is desired, and which forms a support for this bearing. This member 13 is of metal, the outer surface 14 of which is spherical, and it is mounted in two supporting rings or bushings 15 and 16 also of metal and having a spherical inner surface 17 corresponding with the outer surface of the spherical member 13. The member 13 has a transverse straight bearing 18 for connection with the operating mechanism. This bearing is mounted in the material of the body 10 by an improved method, as will be more fully described. It will be seen from Fig. 2 the inner edges of the two rings 15 and 16 abut as shown at 19 at about the center of the bearing and also that the inner portions of the rings just back of the abutting edges are curved outwardly into the material of the body member, as indicated at 20, with the outer walls from this curved portion to the outer edge of the ring being inclined as indicated at 21, so that the material 10 has a very effective grip on the rings 15 and 16 which will retain them in proper position and prevent their either loosening up or dropping out of the body or stick. There is also provided between the surfaces of the member 13 and the rings 15 and 16 a peripheral groove or channel 22 extending about the member 13 at substantially the center or equator thereof which frees the bearing from the supporting rings at its equator as well as forming a lubricating groove around this spherical member 13. For supplying lubricant to this channel it may be provided on one side with an opening 23 in the edges of the rings 15 and 16 communicating with a channel 24 in the body 10 leading from any suitable fixture 25. This may be a fixture adapted for connection to a pressure pump for supplying the proper lubricant to the channel under pressure. This channel further provides a reservoir for lubricant. This construction and arrangement effectively mounts the bearing in the body of the material 10, and the member 13 is capable of rocking movement in all directions to compensate for any misalignment between the elements to which this device is connected, and the bearing may readily be kept properly lubricated at all times.

The bearing is mounted in the body of the member 10 by an improved method, illustrated partly in Fig. 2 and partly in Fig. 3. Before mounting the bearing in the member 10 this member is provided with a substantially straight transverse opening therethrough indicated by dotted lines 26, and the diameter of this opening is substantially equal to the outer diameter 27 of the malleable metal rings or bushings 28 from which the rings 15 and 16 are formed. These two rings 28 have a substantially straight or cylindrical outer wall 27 and an inner wall which is substantially straight or cylindrical for a portion of its width as indicated at 29, adjacent the inner end of the ring and curved substantially spherically at its outer portion 30, adjacent the outer end of the ring. At its inner end the ring is beveled throughout its periphery, as indicated at 31, with the bevel inclined backwardly and inwardly from the outer surface of the ring and the edge 27'. The diameter of the surface 29 is about equal to that of the member 13 at a point 32 just inside the side surface 33 of the body 10. In forming the bearing in the member 10 the two rings 28 are pressed inwardly simultaneously from opposite sides of the body 10 against the member 13 which is held by any suitable means in dies in a press, as will be more fully described. The inner edge 34 of the rings will first engage the outer surface of the member 13 just a short distance inside the opening 21 or at about the point 32. Then as the rings are further pressed against the surface of the member 13 the curved surface 14 will expand the rings, causing the inner end portions of the rings to follow around this surface forming an inner spherical surface for the rings substantially the same as outer spherical surface 14 of the member 13. However, the rings 28 are made somewhat wider than half the thickness of the body 10, so that the inner edges 27' and bevelled ends 31 of the two rings will come together at the center of the member 13 in the body 10, and as they are pressed further together these two bevelled ends or edges will force each other outwardly, causing the flare or bend 20 as indicated in Fig. 2, and the two bevels will become substantially parallel with the sides of the member 10, and will abut as indicated at 19 in Fig. 2. However, this outward flaring or bending of the inner end portions of the rings will also carry a portion of this inner end of the rings away from the surface of the member 13, freeing the member 13 from these rings at its peripheral center or equator and at the same time forming the lubricating channel 22.

One mechanism for accomplishing this method of mounting is shown in Fig. 3. This comprises a die shoe 35 adapted to be mounted in a suitable press below the vertically movable press ram 36. The shoe 35 is recessed at 37 to receive the collar 38 provided with pockets 39 for a set of coil springs 40. The collar 38 has a reduced portion 41 about a shoulder 42 and the reduced portion 41 is surrounded by a slidable sleeve 43 having a flange 44 in the socket 37 and provided with recesses 45 in alignment with the recesses or pockets 39 to receive the upper end of the springs 40. Upward movement of the sleeve 43 is limited by a ring or plate 46 secured over the recess 37 by suitable screws 47. Within the sleeve 43 is a second sleeve or bushing 48 supported by the top surface 49 of the collar 38, and within this sleeve is a pin 50 extending into the bearing 18 in the member 13 to align this member in the die. The upper end of the opening in the sleeve or bushing 48 is tapered downwardly and inwardly as indicated at 51, the diameter of the upper and larger end being such as to receive and form a limit stop for the lower end of the member 13, for a purpose presently to be described. In the press ram 36 is a tubular plunger 52 depending therefrom at its lower end and provided with a recess 53 leading upwardly from this lower end in which is located the head 54 of an adjustable screw 55 which is adjustable longitudinally of the plunger 52 and is locked in adjusted position by a set screw 56.

In operation, the member 13 is placed on the pin 50 which aligns it with the die, this member 13 being in the straight opening 26 of the body 10. The two rings 28 are placed one above and one below the member 10 with their inner bevelled ends 31 extending a short distance into the opening 26 and resting against the spherical surface of the member 13, the plunger 52 of course being raised sufficiently above the bushing 48 to permit these parts to be inserted between them. The body member 10 is supported on the upper end of sleeve 43. When the plunger 52 is moved downwardly, this member co-operates with the bushing 48 to press the two rings against the member 13, and as shown in Fig. 3, the movement of the plunger is such that the inner bevelled edges of the two rings are brought together and mutual pressure between them, as described above, will expand or force them outwardly, as indicated at 20, to embed these edges in the material of the body 10 and also free the member 13 from these rings at its central peripheral or equator line, as well as form the lubricating channel 22. This action thus frees the spherical bearing member 13 from the tight grip of the rings or bushings 15 and 16 at the central or equatorial portion of the bearing member, making it much easier to completely free the bearing from the bushings to permit it to turn or rock freely in these bushings. It will be seen that in this operation, as these rings 28 are expanded the material of the body 10 about these rings is forced outwardly or expanded, and the inner portions of the ring are curved outwardly and embedded in this material 10, as indicated at 29, and the remaining outer surfaces are tapered or inclined as shown at 21. Thus the material of the body 10 is stressed and as it tends to return to its original position due to its resiliency, it provides a very effective and firm grip on the two finished rings 15 and 16 which will effectively retain them in proper position in the body 10, and will also effectively support the member 13.

However, as this expanding action of the member 13 on the two rings would provide a very tight grip on the rocking member 13, the member 13 must be further loosened up in the rings or bushings 15 and 16 to permit its free rocking movement. This further loosening up to permit proper movement of the member 13 is also secured automatically by action of the device shown in Fig. 3 as a part of the operation of mounting the bearing in the member 10. For this result, the screw 55 is adjusted so that its lower end 57 will engage the upper end of the member 13 just before the two rings 15 and 16 are completed, and in its final movement this member 54 will push the member 13 downwardly a very short distance into the recess 51 of the inner bushing 48. This movement is very slight, say, for example, only one or two thousandths of an inch, but it will force the outer surface of the member 13 against the inner surface of the ring 16 and will expand this ring slightly as well as move the member 13 downwardly a slight distance relative to the upper ring 15. In other words, this slight movement of the member 13 downwardly by the member 54 as the two supporting rings 15 and 16 are completed in the die will provide just enough clearance or freedom between the bearing member 13 and the two rings 15 and 16 to overcome the binding action caused by the expanding action of the rings 15 and 16, so that the member 13 is free to turn in the rings 15 and 16 by a good bearing fit and with no looseness. As the inner edge portions 20 of the rings 15 and 16 are already free from the spherical member 13, there is no binding of the central or equatorial portions of the spherical surface 14 in the ring 16 by this forcing of member 13 into this ring. In other words, the bearing member 13 is automatically freed from the binding action of the two rings 15 and 16 as a part of the operation of forming and mounting these rings and the member 13 without any separate operation, as would otherwise be required.

Figure 4:
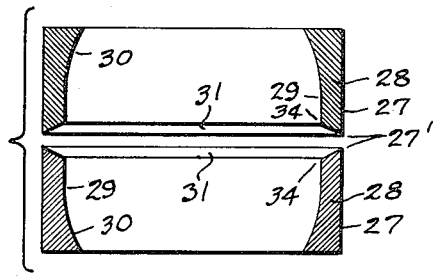
Fig. 4 is a section through the two rings or bushings used to mount the spherical bearing member showing substantially their shape before the mounting operation.
Figure 5:
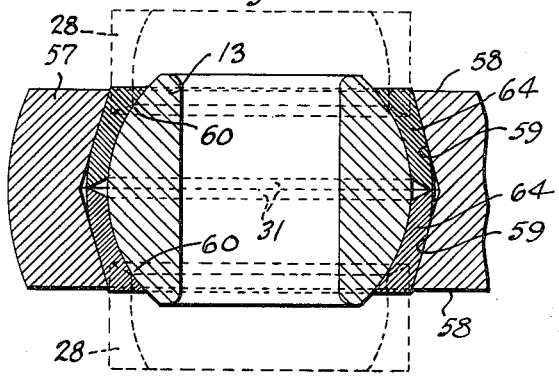
Fig. 5 is a section through the bearing in a metal support showing the positions of the parts just before the final action in the method of forming or mounting the bearing.
Figure 6:
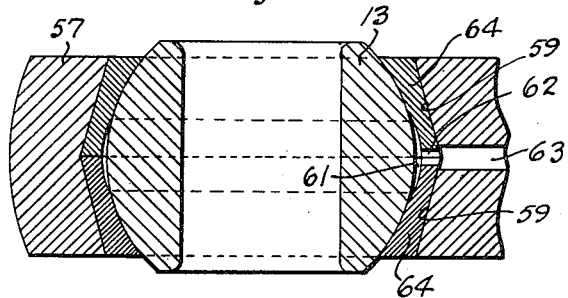
Fig. 6 is a similar section showing the completed bearing.

In the modifications of Figs. 5 to 11, instead of mounting the rings or bushings for the spherical bearing member in a supporting member of rubber or plastic such as the body or housing 10, they are mounted in a housing or body 57 of metal. The two rings or bushings for mounting the spherical bearing member in this body or housing forming the supporting member are the same as the rings 28 used in the form of Figs. 1, 2 and 3, and shown closely together and opposing each other in Fig. 4. In the form of Figs. 5 and 6 the metal housing or body 57 is provided with a transverse opening which is tapered inwardly and outwardly from its opposite side walls 58, as shown at 59. The entrances to this opening are of substantially the same diameter as the outer diameter 27 of the rings 28, and in mounting the bearing 13 in the housing 57 these rings are forced against the opposite sides thereof, the same as in Figs. 2 and 3, and by the same mechanism. That is, the inner diameter of the rings 28 is such that the inner line 34 of the bevelled inner end of the ring will contact the spherical surface of the bearing 13 just inwardly of the outer side surfaces 58 of the housing, or at about the line 60, corresponding to the line 32 in Fig. 2. Then as the rings are forced together to the full line position of Fig. 5, they will be expanded to conform at their inner surfaces with the outer spherical surface of the member 13 and they will also be forced against the tapered surfaces 59 of the opening in the member 57 until their inner edges 27' abut as shown in Fig. 5. Then as the rings are further forced inwardly these abutting bevelled edges will mutually press each other outwardly to the position of Fig. 6 and will force their inner end portions away from the surface of the member 13 to free the central or equatorial portion of the spherical surface from the tight grip of these rings. This could be only sufficient to free the inner bearing member or it could be more as shown, so as to space the inner surfaces of the rings from the central or equatorial portion of the bearing member to form a peripheral channel 61 about this member. At the same time it will force the inner ends of the rings outwardly to fill the transverse opening of the housing 57. In this position the inner beveled ends 31 of the two rings are in abutment and lie side by side as shown in Fig. 6. This channel 61 may form a lubricating channel for the bearing, and if sufficiently wide may provide a reservoir for the lubricant to maintain the bearing properly lubricated. An opening 62 may be provided leading from a supply channel 63 for feeding lubricant to the first channel 61, as described in connection with Fig. 2. It will be evident this forms an effective mounting for the bearing member 13 and that the rings are effectively held in this position by the tapered walls 59 in the opening in the housing. The bearing member 13 is further freed from the rings or bushings 64 formed in this operation by the slight lateral movement of the member 13 into one of these bushings and away from the other, as described in connection with the apparatus of Fig. 3. Thus the member 13 is free to rock or turn laterally in the bushings without requiring any additional operation.

Figure 7:
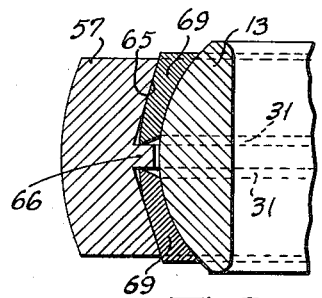
Fig. 7 is a detail section showing a modification and the parts in an intermediate position during the operation of forming or mounting the bearing.
Figure 8:
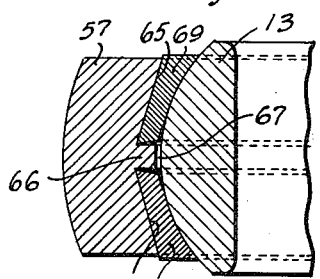
Fig. 8 is a similar section showing the next position.
Figure 9:
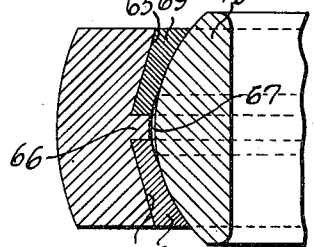
Fig. 9 is a similar section showing the completed bearing of Figs. 8 and 9.

In the modification of Figs. 7, 8 and 9, instead of the tapered surfaces 65 of the opening in the housing 57 being carried to the center, they are stopped short of the center at an annular rib 66. Then as the rings 28 are forced into this opening and against the spherical outer surface of the bearing member 13, as described in connection with Figs. 5 and 6, instead of their inner beveled edges abutting each other as described in connection with Figs. 5 and 6, they engage the opposite sides of the rib 66 and by a camming action thereon are forced outwardly away from the surface of the member 13, as shown in Figs. 8 and 9, to fill the opening in the housing and to free the central portion of bearing member 13 from the grip of these rings. They may also be forced outwardly sufficiently to form the lubricating channel 67, the inner edge of the rib 66 being spaced sufficiently from the surface of the member 13 to permit this.

Figures 10, 11:
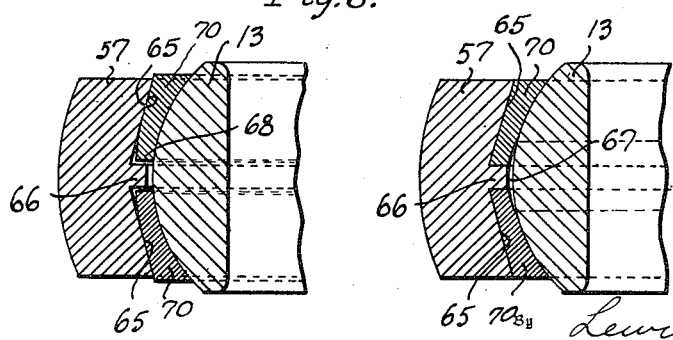
Fig. 10 is a detail section showing another modification and with the parts in an intermediate position.
Fig. 11 is a similar section showing the bearing of Fig. 10 completed.

In the modification of Figs. 10 and 11 the housing 57 is the same as that of Figs. 7, 8 and 9, with the peripheral rib 66 at a midpoint between its opposite side surfaces. In this case, however, instead of using the rings 28 with bevelled ends 31 the rings are used with ends 68 which are at substantially right angles to the outer surface of the rings or only slightly bevelled, and when these rings engage the opposite side surfaces of the ribs 66 they are forced outwardly by this rib to the position of Fig. 11, freeing the central or equatorial portion of the bearing from the grip of the rings and forming the lubricating channel 67. The bevelled end arrangement is, however, preferred. In each form of Figs. 5 to 11 the spherical bearing member 13 is further freed from the supporting ring or bushings 69 and 70 by the further slight lateral movement of the bearing member 13 into one ring and away from the other, as described in connection with the apparatus and method illustrated in Fig. 3.

It will be seen from the above that a new and effective bearing is mounted in its support with a single operation and the bearing is not only properly mounted in position, but it is accurately and completely mounted by a single operation, so that no further operations are required to make it operative. In the form of support shown in Figs. 1, 2 and 3, the two supporting rings or bushings 15 and 16 are properly and effectively held by the resilient action of the material of the member 10 and this material is stressed to secure this operation by the operation of mounting the bearing in this material. In the forms of Figs. 5 to 11 the rings or bushings are shaped as they are forced into position in the bore or opening in the metal support and against and about the spherical bearing member as described, and are effectively secured and held in the support by the walls of the bore. In each form the inner end portions of the rings or bushings may be forced outwardly only sufficient to free or loosen their tight grip on the spherical bearing member or they can be forced further outwardly as shown to provide the channel about the bearing member.

Any suitable material may be used for the bearing member 13 and the rings 15 and 16, but the preferred material is steel for the member 13 and bronze or similar malleable material for the rings.

Having thus set forth the nature of my invention, I claim:

1. A method of making a bearing structure which comprises forming a supporting member of yieldable resilient material, forming a transverse opening in the member, placing a spherical bearing member in the opening, placing a pair of mounting rings on opposite sides of the supporting member and bearing member, which rings have inwardly beveled inner edges and are of an internal diameter less than the outer diameter of the bearing member and an outer diameter substantially that of the opening, pressing said rings against the bearing member to expand them tightly against this member and expand them against the material of the supporting member about the opening to clamp the rings, and then pressing the inner beveled edges of the rings together to force these edges outwardly away from the bearing member sufficiently to free this member from the grip of the rings.

2. A method of making a bearing structure which comprises forming a supporting member with a transverse opening, placing in the opening a spherical bearing member, pressing against said bearing member from the opposite sides thereof a pair of malleable mounting rings of smaller internal diameter than the spherical member to expand these rings tightly against said member to tightly fit this member and also expand the rings against the walls of the opening in the supporting member to clamp the rings in the opening, and pressing the inner edges of the rings together to force the portion of the rings adjacent these edges outwardly away from the spherical member sufficiently to free the central or equatorial portion of the bearing member from the grip of the rings.

3. A method of making a bearing which comprises forming a housing with a transverse opening, placing a spherical bearing member in the opening, placing a pair of mounting rings on opposite sides of the bearing member which rings each have an inwardly beveled inner end edge and are of a smaller internal diameter than the bearing member, forcing the rings against the bearing member to expand them about and tightly fit this member and also expand the rings against the walls of the opening in the housing to secure the rings in this opening, forcing the beveled edges of the rings together to expand the inner edge portions of the rings away from the bearing member to provide a channel about the bearing member and release the grip of these edge portions on this member, and then holding one ring and forcing the bearing member slightly into this ring and away from the other ring to loosen the bearing member from the grip of the rings.

4. A method of making a bearing which comprises forming a supporting housing with a transverse opening including an annular rib projecting into the opening at substantially the center thereof, placing a spherical bearing member in the opening, pressing against said spherical member from the opposite sides thereof a pair of malleable mounting rings of smaller internal diameter than the spherical member so that as they are pressed against said member they are expanded to tightly fit this member and also seat against the walls of the opening to secure the rings in this opening, and forcing said rings into the openings sufficiently to cause their inner ends to abut the sides of the rib and the ends of the rings and the rib being so shaped that these ends are forced outwardly by the rib to free these end portions of the rings from their fit on the spherical member.

5. A method of making a bearing structure which comprises forming a supporting member with a transverse opening, inserting a spherical bearing member in said opening, forcing against said spherical member from the opposite sides thereof a pair of malleable mounting rings of smaller internal diameter than the spherical member to expand them to tightly fit the spherical surface of the bearing member and the walls of the opening in the supporting member to mount them in the opening, and then in the same operation causing relative axial movement between the bearing member and the rings for a short distance to force the bearing member a slight distance into one ring and away from the other ring to loosen this member to free it from the grip of the rings for angular bearing movements in the rings.

References Cited in the file of this patent

UNITED STATES PATENTS

| | | |
|---|---|---|
| 1,824,028 | Miller | Sept. 22, 1931 |
| 1,895,093 | Carlson | Jan. 24, 1933 |
| 2,005,004 | Peo | June 18, 1935 |
| 2,016,923 | Herrmann | Oct. 8, 1935 |
| 2,182,487 | Chadbourne | Dec. 5, 1939 |
| 2,195,749 | Lignian | Apr. 2, 1940 |
| 2,252,351 | Paulus | Aug. 12, 1941 |
| 2,366,668 | Heim | Jan. 2, 1945 |
| 2,381,391 | Brown | Aug. 7, 1945 |
| 2,400,506 | Heim | May 26, 1946 |
| 2,445,745 | Moe | July 20, 1948 |
| 2,476,728 | Heim | July 19, 1949 |
| 2,592,566 | Heim | Apr. 15, 1952 |
| 2,629,165 | Stillwagon | Feb. 24, 1953 |